United States Patent [19]

Rawson

[11] 4,159,809

[45] Jul. 3, 1979

[54] PREWOUND RETRACTOR SPRING HOUSING ASSEMBLY

[75] Inventor: Gerry Rawson, Valencia, Calif.

[73] Assignee: American Safety Equipment Corporation, Encino, Calif.

[21] Appl. No.: 867,475

[22] Filed: Jan. 6, 1978

[51] Int. Cl.² .................. B65H 75/48; F03G 1/08
[52] U.S. Cl. ............................ 242/107; 29/418; 29/446; 185/45
[58] Field of Search ............... 242/107–107.7; 185/45; 29/418, 446

[56] References Cited

U.S. PATENT DOCUMENTS

| | | | |
|---|---|---|---|
| 2,602,958 | 7/1952 | Brown | 29/446 X |
| 3,062,479 | 11/1962 | Griffitts | 242/107.5 |
| 3,384,321 | 5/1968 | Becker et al. | 242/107.5 |
| 3,447,229 | 6/1969 | Clark | 29/418 |
| 3,694,588 | 9/1972 | Appleton | 242/107.5 X |
| 4,045,079 | 8/1977 | Arlauskas et al. | 242/107.4 A X |

*Primary Examiner*—Harvey C. Hornsby
*Assistant Examiner*—John M. Jillions
*Attorney, Agent, or Firm*—Poms, Smith, Lande & Rose

[57] ABSTRACT

A prewound retractor spring housing assembly for mounting to a preassembled safety belt retractor having a storage reel shaft end protruding from a side wall of the retractor, the shaft end having a retraction spring end receiving slot, has a spring mounting base means for receiving a retractor coil spring to be prewound thereon, spring cup means for encompassing the coil spring when prewound on the base means and for cooperating with the base means to prewind the spring to a desired prewound condition, means for locking the cup means to the base means and means for mounting the assembly to the safety belt retractor in a manner to automatically place the prewound spring in biasing relation to the safety belt reel.

12 Claims, 15 Drawing Figures

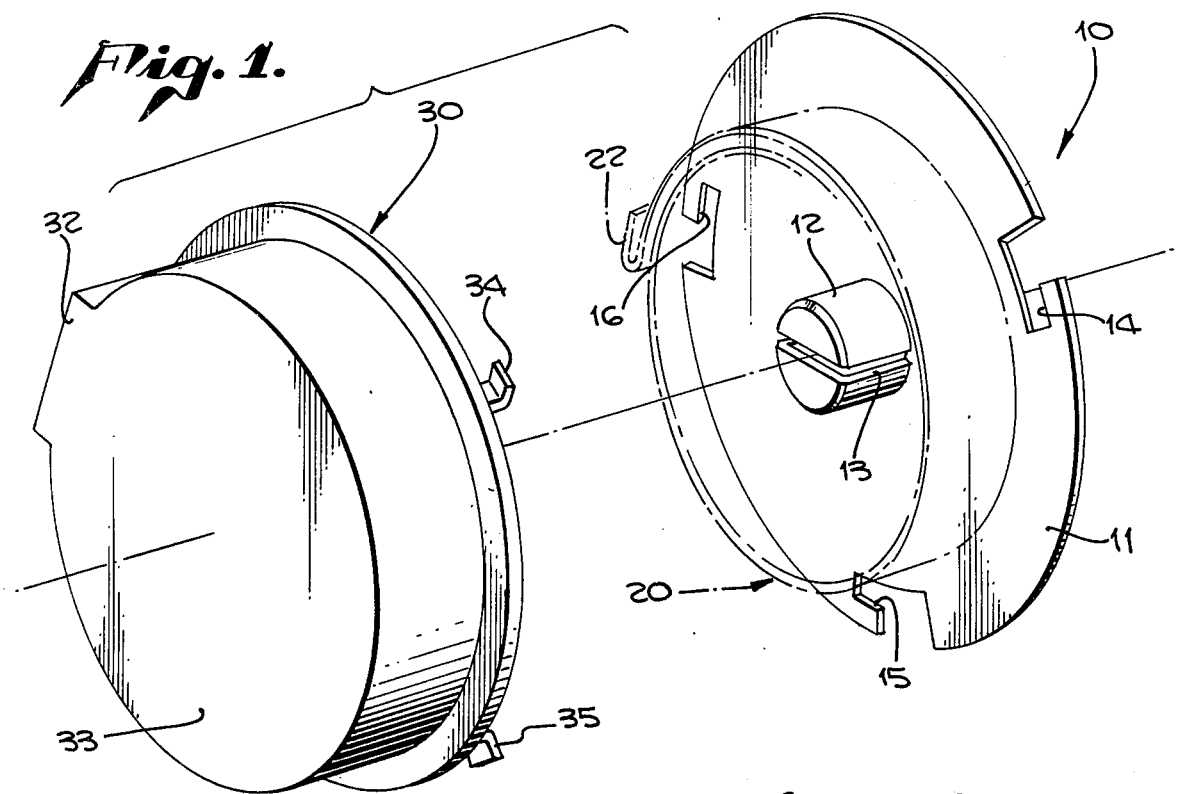
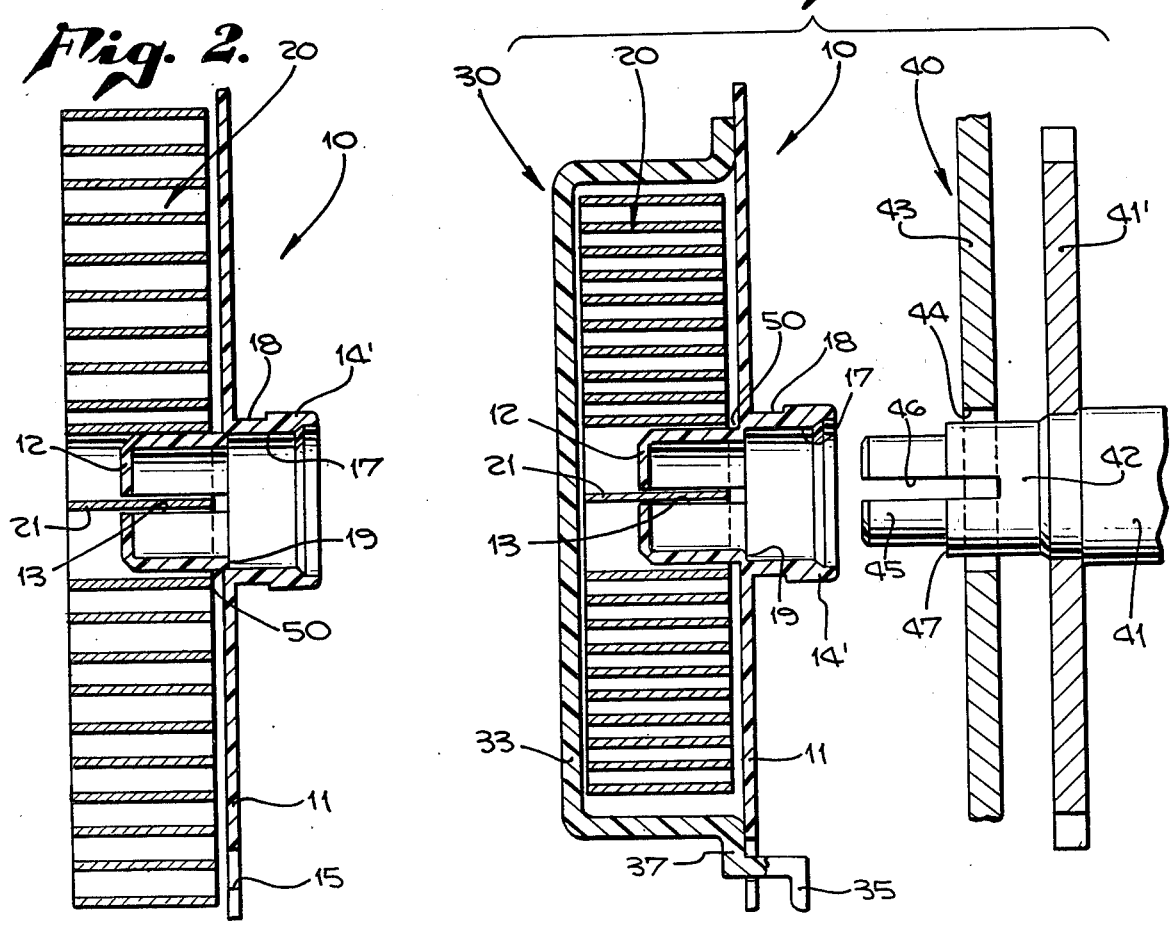

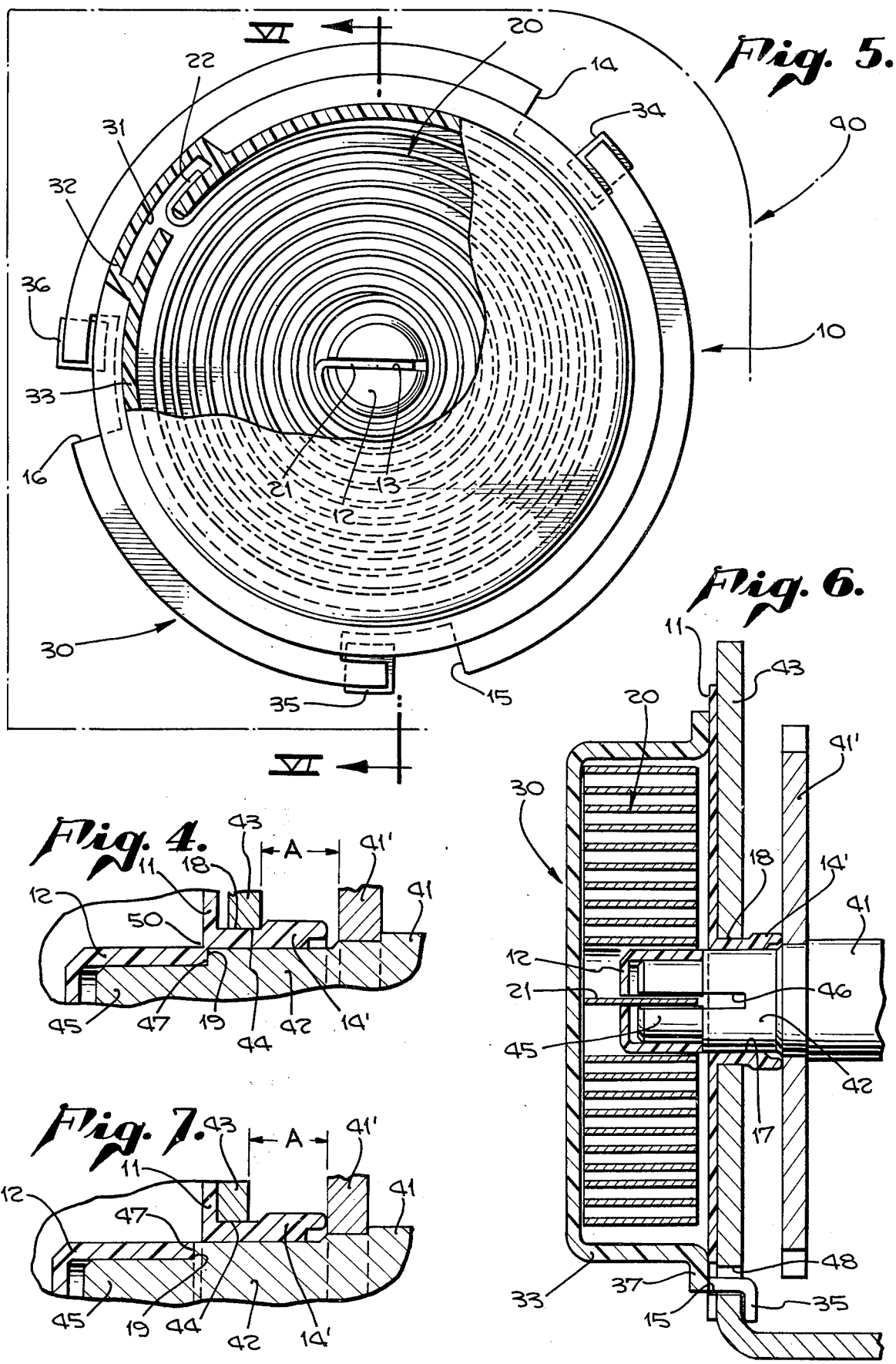

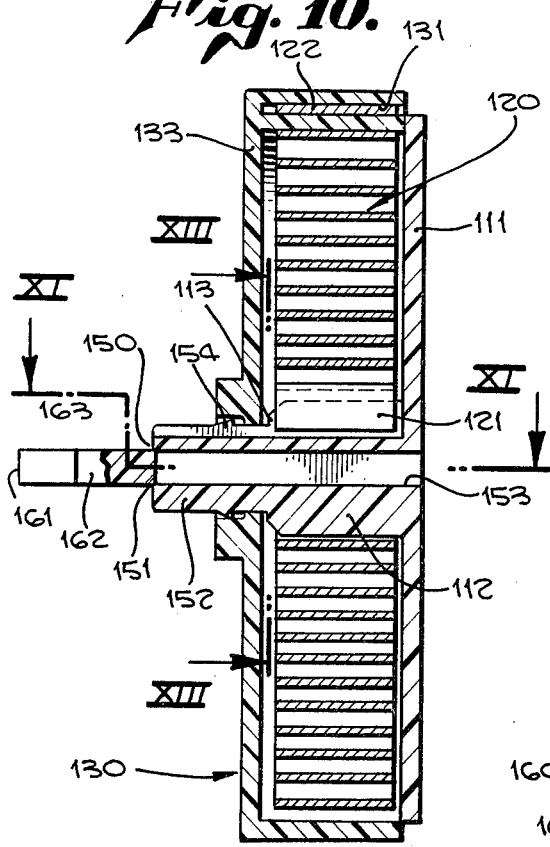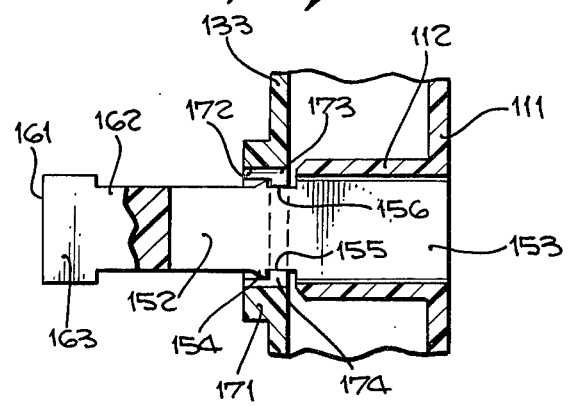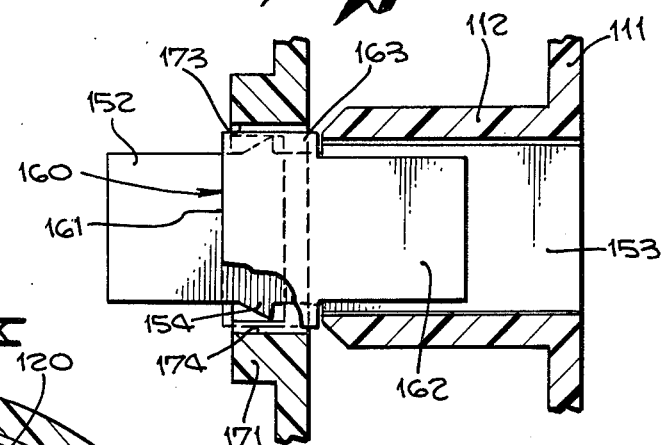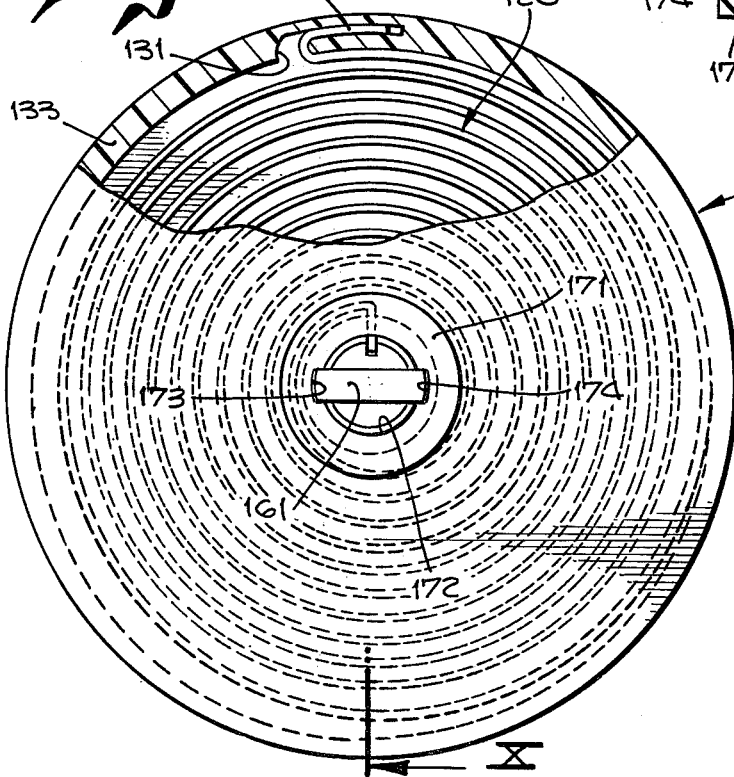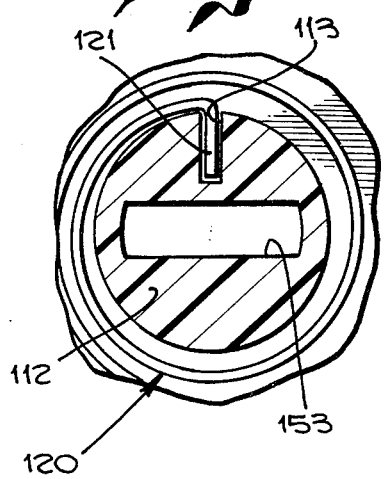

PREWOUND RETRACTOR SPRING HOUSING ASSEMBLY

BACKGROUND OF THE INVENTION

The present invention relates generally to safety belt retractors having a retractor spring for biasing the safety belt reel to a safety belt wound condition. More particularly, the present invention relates to a prewound retractor spring housing assembly wherein the retractor spring is maintained in a prewound condition within the assembly preparatory to mounting to a preassembled safety belt retractor.

Various types of safety belt retractors are currently in use in automotive and aircraft vehicles in association with safety belts and safety harnesses employed for restraining a passenger in his vehicle seat in the event of a sudden deceleration of the vehicle or other emergency conditions. Such retractors normally have a power spring for biasing an associated safety belt reel toward a fully wound condition wherein associated safety belt or harness webbing is stored within the retractor. Heretofore, it has been common to provide such retractor springs within a housing on the side wall of a U-shaped retractor frame with an inner end of the spring engaging in a slot provided in an end of the reel shaft protruding through the retractor frame side wall.

In such prior retractors, it has also been common to wind the spring when in engagement with the reel shaft to a desired prewound condition and then assemble a surrounding housing having means for retaining the outer free end of the spring against a spring unwinding movement. Such housings have been generally made of plastic material and fastened to the retractor side wall by appropriate fastening means, such as bolts, screws or the like. The assembly of the power spring has thus heretofore been accomplished in association with the fabrication of the retractor in what is now considered less convenient than an arrangement wherein the power spring could be provided in a prewound condition from the spring manufacture for simple assembly to the retractor.

SUMMARY OF THE INVENTION

It is a primary object of the present invention to disclose and provide a prewound retractor spring housing assembly for encapsulating a prewound retractor spring and retaining the spring in a desired wound state during transportation and handling before mounting to a retractor with which it is to be associated.

It is a further object of the present invention to disclose and provide a prewound retractor spring housing assembly as in the foregoing object wherein the assembly is so provided as to be easily and effeciently mountable to a preassembled safety belt retractor having a storage reel shaft end protruding through one side wall thereof.

It is a still further object of the present invention to disclose and provide a prewound retractor spring housing assembly as in the foregoing objects wherein the construction and mode of operation is so provided that the prewound retractor spring is automatically placed in condition to bias the retractor reel toward a belt storing condition by the step of mounting the assembly to the retractor.

Generally stated, the present invention in prewound retractor spring housing assembly comprises the provision of a spring mounting base means for receiving an unwound retractor coil spring thereon the base means having a first spring in engaging means for holding a first end of the coil spring stationary relative to the base so that the spring can be prewound thereon. Spring cup means are provided for encompassing the coil spring when mounted to the base means and, in an exemplary embodiment, serves to prewind the spring means to a desired wound condition through relative rotation of the spring cup means and base means with an outer end of the coil spring engaged by the cup means. As contemplated within the present invention, means are provided for locking the cup means to the base means with the spring in a desired prewound condition and means are provided for mounting such assembly to the retractor in a manner to place the first spring end in operable relation to the reel shaft by the step of mounting the spring housing assembly to the retractor side wall over the reel shaft end which protrudes through such side wall.

In a first examplary embodiment, frangible means for connecting the first spring end to the base means are provided in a manner that the connection is automatically broken upon mounting of the spring housing assembly to the retractor as the reel shaft, having a slotted end, engages with and entrains the first spring end.

In a second exemplary embodiment of spring housing assembly in accordance with the present invention, the means for locking the cup means to the base means is automatically unlocked in response to movement of the retractor reel shaft end into the assembly with the shaft end engaging the base means to be thereby placed in spring biased condition relative to the retractor spring.

A more complete understanding of the present invention, as well as a recognition of various advantages will be afforded to those skilled in the art from a consideration of the following description of two exemplary embodiments of prewound retractor spring housing assemblies according to the present invention. The drawings will be described frist.

DESCRIPTION OF THE DRAWINGS

FIG. 1 is a perspective, exploded view of a preferred exemplary embodiment of prewound retractor spring housing assembly according to the present invention with the retractor spring shown in phantom line;

FIG. 2 is a section view of the spring mounting base means of the assembly of FIG. 1 showing a retractor spring wound thereon;

FIG. 3 is a section view of the preassembled and prewound retractor spring housing assembly of FIG. 1 positioned for assembly to a safety belt retractor having a storage reel shaft end protruding through a side wall thereof;

FIG. 4 is a detail view of a portion of the assembly of FIG. 3 shown in engagement with the reel shaft end;

FIG. 5 is an end view of the assembly of FIG. 1 shown assembled to a side wall of an exemplary retractor;

FIG. 6 is section view of the assembly and retractor of FIG. 5 taken therein along the plane VI—VI;

FIG. 7 is a detail view of the assembly of FIG. 6;

FIG. 9 is an end view of the prewound retractor spring housing assembly of FIG. 8, partially in section;

FIG. 10 is a section view of the assembly of FIG. 9 taken therein along the plane X—X.

FIG. 11 is a detail section view of the assembly of FIG. 10 taken therein along the plane XI—XI before the means for locking the cup means to the base means is operated to locked position;

FIG. 12 is a detail section as in FIG. 11 showing the means for locking the cup means to the base means moved to locked position and prior to assembly of the prewound retractor spring housing assembly to a retractor storage reel shaft end;

FIG. 13 is a section view of the assembly of FIG. 10 taken therein along the plane XIII—XIII;

DETAILED DESCRIPTION OF A PREFERRED EXEMPLARY EMBODIMENT

Figure 8:
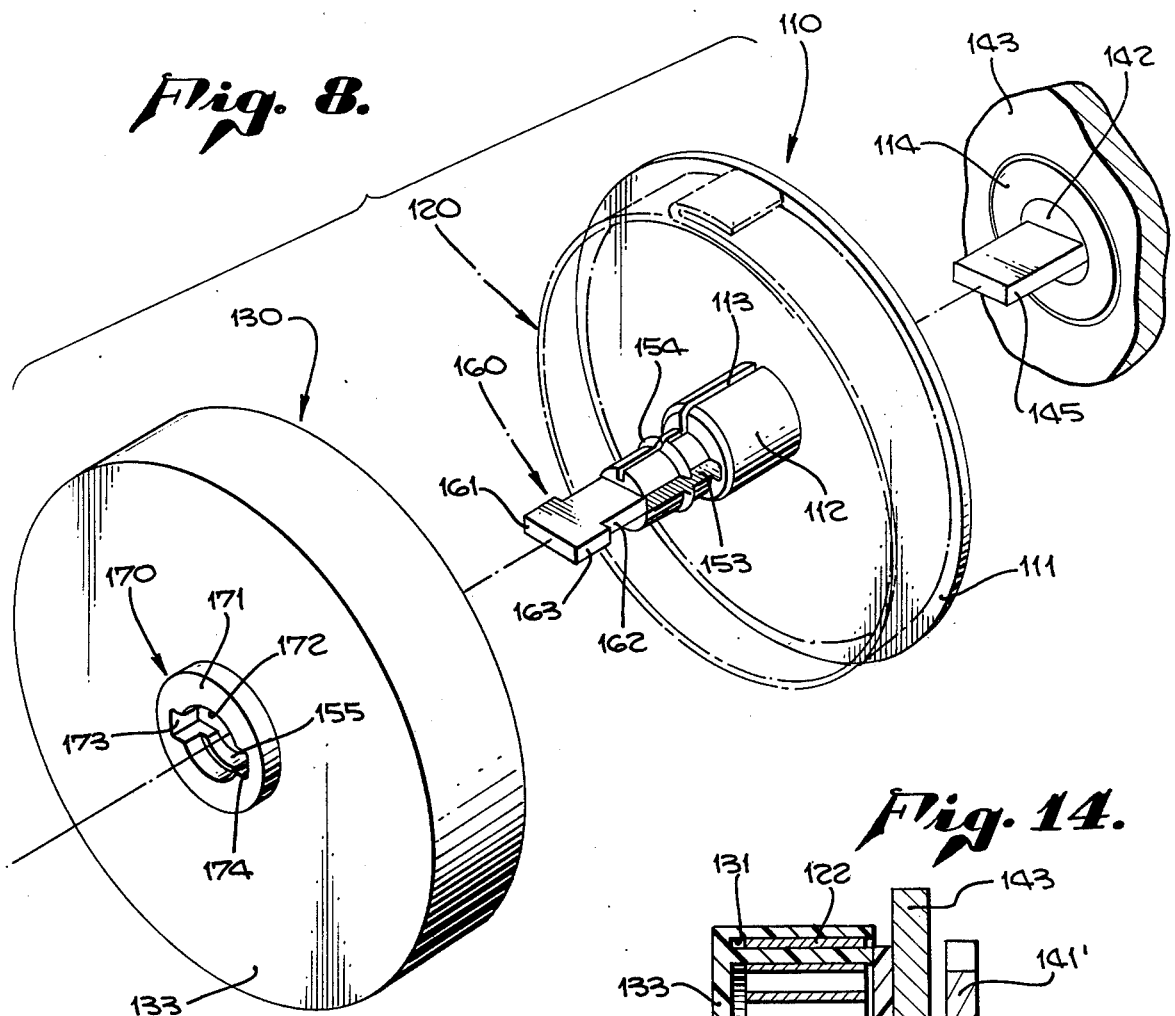
FIG. 8 is a perspective, exploded view of an alternative exemplary embodiment of prewound retractor spring housing assembly, in accordance with the present invention, with the retractor spring shown in phantom line and the assembly aligned to a reel shaft end of a retractor.

Referring now to FIGS. 1 through 7, a preferred exemplary embodiment of prewound retractor spring housing assembly in accordance with the present invention will now be explained. Referring initially to FIG. 1, the assembly of the present exemplary embodiment is illustrated in exploded relationship with the spring mounting base means indicated generally at 10 and the spring cup means being indicated generally at 30. An exemplary retractor storage reel rewind spring is illustrated in phantom line generally at 20.

The spring mounting base means, indicated generally at 10, in this exemplary embodiment includes a base member 11 of disk-like configuration having a hollow stub shaft 12 formed integrally on one side and centrally thereof. Stub shaft 12 is preferably formed integrally of base 11, in a manner more fully discussed hereinafter, and is provided with slot 13 to function as means for receiving an inner end of retractor spring 20 positioned upon base 11 and holding such inner end of the coil spring stationary relative to the base. As seen in FIG. 2, an unwound retractor spring, indicated generally at 20, may be positioned against base 11 about stud 12 with an inner spring end 21 in engagement with slot 13. As further seen in FIG. 2, a bushing 14' is formed integrally on a central rear wall of base 11 aligned with hollow stud 12 to guide the assembly onto a retractor reel shaft end and form part of means for mounting the assembly to the retractor as hereinafter explained.

With the retractor spring, indicated generally at 20, initially mounted on base 11, as seen in FIG. 2, the spring cup, indicated generally at 30, may be positioned over the spring with an outer end 22 of the spring, as best seen in FIG. 5, fitted into a spring end engaging slot 31 formed in boss 32 of the cup body 33. Base 11 and cup 33 may then be rotated relative to one another in order to prewind the retractor spring, indicated generally at 20, to a predetermined desired wound condition.

Means are provided, in accordance with the present embodiment, for locking the cup means indicated generally at 30 to the base means indicated generally at 10 when they have been rotated relative to one another sufficiently to place the retractor spring, indicated generally at 20, in the desired prewound condition. Such means in the exemplary embodiment comprises the provision of a plurality of locking tabs 34, 35 and 36 formed integrally of and extending laterally of the flange 37 of cup 33. Mating locking slots 14, 15 and 16 are formed integrally of base 11 in the manner illustrated in FIG. 1 to receive the respective tabs 34, 35 and 36 respectively. During prewinding of the retractor spring, cup 33 may be positioned with the tabs 34–36 merely overlying base 11 and, when the prewound spring condition desired is achieved, the tabs 34–35 may be slipped into engagement with the locking slots 14–16 to provide a prewound retractor housing assembly as seen in FIG. 3 preparatory to mounting to a preassembled safety belt retractor.

The prewound retractor spring housing assembly of the present invention may be employed with any number of different types of safety belt retractors. Such retractors generally have a safety belt reel, upon which safety belt webbing is wound, mounted to a retractor frame with means for automatically locking the retractor in the event of an emergency condition. In the exemplary embodiment, portions of such a retractor are illustrated in FIGS. 3 through 6 generally at 40 and for purposes of the present description include a belt storage reel including a spindle 41 having ratchet wheel sides, as ratchet wheel 41', upon which the safety belt is wound. In the exemplary embodiment, on the left hand end of spindle 41, as seen in FIG. 3, the reel shaft 42 is sized to pass through retractor side wall 43 and fit within the bore 17 of bushing 41' when bushing 14' is pressed through aperture 44 inside wall 43, as seen in FIG. 6. Bushing 14' has an inner groove 18 formed about its perimeter adjacent base 11 to receive wall 43 with a larger head end of bushing 14' snap fit behind the wall as seen in FIG. 6. As further contemplated within the present invention, shaft end 42 has a protruding smaller diameter portion 45 having a slot 46 to receive the inner spring end 21 of the retractor spring, indicated generally at 20.

As can be seen from a comparison of the exploded view of FIG. 3 and the assembled view of FIG. 6, the preassembled and prewound retractor spring housing assembly in accordance with the present invention, including cup 33 locked by tabs 34–36 to base 11 via locking slots 14–16 may be assembled to the retractor side wall having a reel shaft and configured as illustrated in FIG. 3 to snap bushing 14' onto wall 43 about shaft end portion 42 moving extension portion 45 and its slot 46 into winding engagement with the inner end 21 of the retractor spring. As particularly contemplated within the present invention, the means for connecting the inner spring end 21 locked against rotation relative to base 11, the hollow stub shaft 12 in the exemplary embodiment, is frangible so that on positioning the housing assembly onto the retractor side wall, the inner spring end 21 will be freed from base 11 to apply the bias of the retractor spring against spindle 41 via shaft end 42 and its extension portion 45. In the exemplary embodiment, such means comprise the forming of hollow stub shaft 12 integrally of base 11 with a rather thin interconnecting web 50 at the juncture of the inner end of stub shaft 12 with the base 11 as seen in FIGS. 2 and 3. As seen in FIG. 4, as bushing 14' is pressed through opening 44 of side wall 43, an abutment shoulder 47 on shaft end 42 engages an inner shoulder 19 of stub shaft 12 such that on further pressing of bushing 14 to place base 11 against wall 43, web 50 is broken and stub shaft 12 is freed from base 11 as seen in FIGS. 6 and 7. The retractor spring is then automatically placed in operation biasing shaft 42 and reel spindle 41 in the desired belt winding condition.

As further contemplated within the present invention, the retractor side wall 43 is provided with a plurality of wall slots, as slot 48 in FIG. 6, to receive each of the respective locking tabs 34, 35 and 36 to facilitate locking cup 33 and base 11 to the retractor side wall as illustrated in FIGS. 5 and 6.

SECOND EXEMPLARY EMBODIMENT

Figure 14:
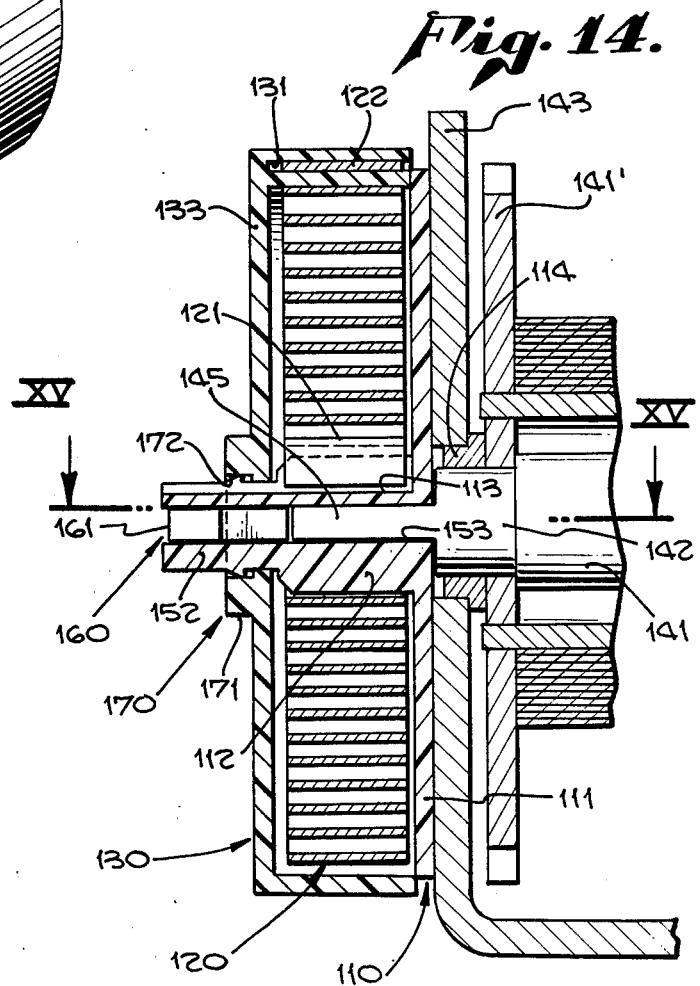
FIG. 14 is a section view of the assembly of FIGS. 8 through 13 assembled to the side wall of an exemplary safety belt retractor with the storage reel shaft end in operable engagement with the prewound retractor spring housing assembly in accordance with the present invention.

Referring now to FIGS. 8 through 15, a second exemplary embodiment of prewound retractor spring housing assembly in accordance with the present invention will now be explained. Referring initially to FIG. 8, the exemplary spring mounting base means is indicated generally at 110 with an exemplary retractor spring, indicated generally at 120 position preparatory to mounting of spring cup means, indicated generally at 130 thereto. A retractor side wall 143 is shown having a generally rectangular shaft end 145 protruding from reel shaft 142 mounted by bushing 114 mounted to the retractor wall in known manner as seen in FIG. 14. As further seen in FIG. 14, the exemplary retractor may include a reel having a spindle 141 having end walls, as ratchet wheel 141' mounting webbing about a spool secured between the reel side walls. As discussed hereinafter, the present embodiment in spring housing assembly is adapted to fit against retractor side wall 143 and receive the rectangular form of shaft end 145 shown.

Referring to FIGS. 8 through 10, the exemplary spring mounting base means, indicated generally at 110, includes base 111 having a stub shaft 112 formed integrally thereof and extending outwardly on one side along the central axis of base 111 as illustrated in FIGS. 8 and 10. A slot 113, as best seen in FIG. 13, if formed in shaft 112 to receive an inner spring end 121 as seen in FIGS. 10 and 13. An unwound retractor spring, as indicated at 120, may be mounted upon base 111 with its inner end 121 in engagement with slot 113, as seen in FIG. 10, and receive the spring cup means, indicated generally at 130, thereover, also as seen in FIG. 10. The exemplary spring cup means, indicated generally at 130, is provided with a slot 131 for receiving an outer free end 122 of the retractor spring to engage the outer end of the retractor spring with the cup 133. Cup 133 may then be rotated relative to base 111 to wind the retractor spring, indicated generally at 120, as seen in FIG. 10, to a desired prewound condition.

Means are provided for locking the cup 133 against rotation relative to the base 111 after they have been rotated relative to one another to place the retractor spring in the desired prewound condition. In the exemplary embodiment, such means includes the provision of a key member, indicated generally at 160 on base 111 and a cooperating key locking slot means indicated generally at 170 on cup 133. As seen in FIGS. 8 and 11, cup 133 is provided with a boss 171 having an aperture 172 formed with opposed through slots 173 and 174 which interrupt the circular configuration of the aperture to provide upper and lower arcuate portions between the slots, such portions having a step configuration, as by shoulders 155 and 156 as seen in FIG. 11.

As seen in FIG. 8, the key locking means indicated generally at 160 includes a key member 161 having a base 162 and head 163. Base 162 is connected by webs 150 and 151 to stub shaft extension 152; member 161, extension 152 and stub shaft 112 all being formed integrally of base 111 as illustrated in FIGS. 8 and 10. Stub shaft 112 and its extension 152 are provided with a rectangular bore 153 as seen in FIGS. 10 through 13 of a size suitable to receive shaft end 145. Bore 153 is an internal bore within stub shaft 112 but becomes open-sided, as seen in FIG. 8, in the portion of stub shaft extension 154. As will be explained shortly, key member 161 is adapted to be pushed into bore 153 as part of the locking mode for the cup and base members.

On assembly of cup 133 over the retractor spring to base 111, the key member 161 and shaft extension 154 pass through aperture 172 of cup 133. Key member head 163 passes through the through slots 173 and 174 with the stub shaft extension 152 passing through the circular portions of aperture 172 until the outer snap ring 154, formed integrally of extension 152, snaps past stop shoulders 155 and 156, as best seen in FIG. 11, to hold cup 133 assembled to base 111. When the retractor spring is prewound to the desired condition, key member base 162 is broken loose from stub shaft extension 152 by breaking the thin webs 150 and 151 and key member 161 is pressed inwardly moving base 162 through bore 153 within stub shaft 112 and the larger head portion 163 into the slots 173 and 174 of cup 133. With the head 163 of key member 161 locked to cup 133 in opposed throughslots 173 and 174, and the key member base 162 nonrotatably fitted within rectangular bore 153, the cup member 133 is effectively locked against rotation relative to base member 111 and the retractor spring is held in the desired prewound condition.

Figure 15:
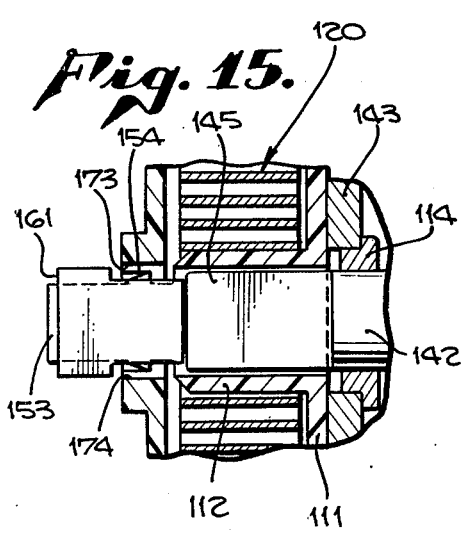
FIG. 15 is a detail section view of the assembly of FIG. 14 taken therein along the plane XV—XV.

With the exemplary embodiment of prewound retractor spring housing assembly in the desired prewound condition thus far explained, it is ready to be assembled to a preassembled retractor in the manner illustrated in FIG. 14. As seen in FIG. 14, the spring housing assembly of base 111, spring indicated generally at 120, and spring cup indicated generally at 130, are mounted to the retractor side wall 143 in otherwise conventional manner, as by having fastening means attach cup 133 to retractor side wall 143 in the manner described hereinbefore with regard to the first embodiment, or as by simple threaded bolts, with the rectangular end 145 of retractor reel shaft 142 received into bore 153. During such mounting of the prewound retractor spring housing assembly to the retractor, the key member 161 is moved outwardly, as seen in FIGS. 14 and 15, disengaging members 133 and 111. With housing cup 133 secured to the retractor side wall, by conventional means as discussed, the bias of the retractor spring, which is in a prewound condition as discussed, is imparted through stub shaft 112 to reel shaft 142 via the shaft end 145 received within bore 153. The retractor is thus placed in operative condition with respect to the rewind spring in accordance with the present invention by merely sliding the shaft free end 145 into housing bore 153 and securing the housing cup 133, as by appropriate bolts, in fixed relation to the retractor side wall.

Having thus described two exemplary embodiments of prewound retractor spring housing assemblies in accordance with the present invention, it should be understood by those skilled in the art that various modifications, adaptations and alterations thereof may be made within the spirit of the present invention which is defined by the following claims.

I claim:

1. A prewound retractor spring housing assembly for mounting to a safety belt retractor having side walls and a belt storage reel shaft end protruding through one side thereof, comprising:

spring mounting base means for receiving a retractor coil spring to be prewound thereon, said base means having frangible means for holding a first end of said coil spring stationary relative said base means until selectively broken to release said first end of said spring from said base means;

spring cup means for encompassing said coil spring when prewound on said base means, said cup means having second spring end engaging means for holding a second end of said coil spring stationary relative to said cup means;

means for locking said cup means to said base means; and means for mounting said assembly to said retractor in a manner to place said first spring end in biasing relation to said reel shaft end.

2. The prewound retractor spring housing assembly of claim 1 wherein said shaft end has a retraction spring end receiving slot and said means for mounting said assembly to said retractor includes bushing means formed in said base means for receiving said retractor reel shaft end and guiding said shaft end slot into engagement with said first spring end.

3. The prewound retractor spring housing assembly of claim 1 wherein said frangible means comprises a slotted hollow stub shaft positioned on said base means in the path of travel of said reel shaft end as it is guided into said base means on mounting of said assembly to said retractor whereby said stub shaft is separated from said base means by the action of said reel shaft end entering said base means on the mounting of said assembly to the retractor.

4. The prewound retractor spring housing assembly of claim 3 wherein said frangible means comprises thin walled portions of said base means formed integrally thereof and of said stub shaft whereby said base means and stub shaft are initially integral.

5. The prewound retractor spring housing assembly of claim 1 wherein said means for locking said cup means to said base means comprises a plurality of locking tabs formed integrally of and extending laterally of said cup and mating locking slots formed on said base means.

6. The prewound retractor spring housing assembly of claim 5 wherein said retractor side wall is provided with a plurality of wall slots and said means for mounting said assembly to said retractor comprises the provision of locking end flange means on said locking tabs whereby said locking tabs protrude through said base means locking slots and retractor wall slots with said locking flange ends underlying said retractor side wall adjacent said wall slots to hold said assembly to said retractor.

7. The prewound retractor spring housing assembly of claim 1 wherein:

said means for locking said cup means to said base means includes a key member moveable between locked and unlocked portions wherein said base means and cup means are locked together and unlocked, respectively; and said base means includes means for receiving said shaft end in nonrotative relation therebetween, whereby said base means rotates said shaft end in response to the bias of said spring when said key member is in unlocked position.

8. The prewound retractor spring housing assembly of claim 7 wherein:

said frangible means comprises frangible web connections fabricated integrally of said base member and said key member with said frangible web connections therebetween whereby said key member may be manually seperated from said base preparatory to being moved to said locked position.

9. The prewound retractor spring housing assembly of claim 7 wherein:

said base means includes a bore for receiving said shaft end, said bore extending through said base;

said cap means has a throughslotted aperture aligned to said bore; and said key member has a base portion slidably fitting said bore and a head portion slidably fitting said slotted aperture when said key is in said locked position whereby upon insertion of said shaft end into said bore, said shaft end abuts said key member and moves it to said unlocked position.

10. A method of assemblying a power spring to a safety belt retractor having a retractor frame side wall and a reel shaft including an end protruding from the retractor side wall comprising the steps of:

prewinding a power spring within a spring housing assembly with an inner end of the spring held by the assembly against unwinding movement to maintain the spring in a prewound condition; and automatically releasing said inner end of the spring from the assembly and placing it in biasing relation with the retractor reel by insertion of said reel shaft end into the assembly during mounting of the assembly to the retractor side wall.

11. The method of claim 10 wherein said step of automatically releasing said inner end of the spring includes the step of breaking a frangible connection between the assembly and inner spring end by the insertion of said shaft end into the assembly.

12. The method of claim 10 wherein said step of automatically releasing said inner end of the spring includes the step of sliding a key member out of interlocking relation between parts of the assembly holding the spring end engaging and moving the key member on insertion into the assembly.

* * * * *